US008706478B2

(12) United States Patent
Fletcher et al.

(10) Patent No.: US 8,706,478 B2
(45) Date of Patent: *Apr. 22, 2014

(54) TRANSFORMING A NATURAL LANGUAGE REQUEST FOR MODIFYING A SET OF SUBSCRIPTIONS FOR A PUBLISH/SUBSCRIBE TOPIC STRING

(75) Inventors: Benjamin J. Fletcher, Huddersfield (GB); Gareth E. Jones, Winchester (GB)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,869

(22) Filed: Apr. 25, 2012

(65) Prior Publication Data

US 2012/0245943 A1 Sep. 27, 2012

Related U.S. Application Data

(63) Continuation of application No. 12/371,992, filed on Feb. 17, 2009, now Pat. No. 8,229,736.

(30) Foreign Application Priority Data

Apr. 16, 2008 (EP) ..................................... 08154603

(51) Int. Cl.
*G06F 17/27* (2006.01)
*G06F 15/16* (2006.01)
*G06F 7/00* (2006.01)

(52) U.S. Cl.
USPC ............... 704/9; 709/217; 709/227; 709/229; 707/627

(58) Field of Classification Search
USPC .................... 704/9, 270.1; 709/217, 227, 229
See application file for complete search history.

(56) References Cited

U.S. PATENT DOCUMENTS 7,305,406 B2   12/2007  Liu et al.
7,412,493 B2    8/2008  Duigenan et al.
(Continued)

FOREIGN PATENT DOCUMENTS

JP    04-002180 A     7/1993
JP    13-144801 A    11/2002
(Continued)

OTHER PUBLICATIONS

Han Li and Guofei Jiang, "Semantic message oriented middleware for publish/subscribe networks," Sensors, and Command, Control, Communications, and Intelligence (C3I) Technologies for Homeland Security and Homeland Defense III, Monday Apr. 12, 2004, Orlando, FL, USA.*

(Continued)

*Primary Examiner* — Angela A Armstrong
(74) *Attorney, Agent, or Firm* — Wolf, Greenfield & Sacks, P.C.

(57) ABSTRACT

A natural language request for modifying a set of subscriptions for one or more topics in a publish/subscribe topic hierarchy is received at a processing device. The natural language request includes a predetermined natural language element. The natural language request is transformed into a publish/subscribe topic string and the predetermined natural language element is transformed into a publish/subscribe symbol. The symbol represents one or more topics in the topic hierarchy. One or more subscriptions to one or more topics is modified based on the transformed topic string.

20 Claims, 4 Drawing Sheets

(56) References Cited

U.S. PATENT DOCUMENTS

| | | | |
|---|---|---|---|
| 7,672,908 B2 * | 3/2010 | Tomasic et al. | 706/12 |
| 2005/0187964 A1 | 8/2005 | Nakamura et al. | |
| 2005/0261923 A1 | 11/2005 | Brown et al. | |
| 2009/0216884 A1 * | 8/2009 | Larvet | 709/226 |

FOREIGN PATENT DOCUMENTS

| | | | |
|---|---|---|---|
| JP | 16-047377 A | | 9/2005 |
| WO | 02103559 A2 | | 12/2002 |
| WO | 2007/085589 A2 | | 2/2007 |
| WO | WO 2007/085589 | * | 8/2007 |

OTHER PUBLICATIONS

United States Patent and Trademark Office, Office Action for U.S. Appl. No. 12/371,992, Aug. 22, 2011, pp. 1-14, Alexandria, VA, USA.

United States Patent and Trademark Office, Office Action for U.S. Appl. No. 12/371,992, Jan. 13, 2012, pp. 1-10, Alexandria, VA, USA.

United States Patent and Trademark Office, Notice of Allowance for U.S. Appl. No. 12/371,992, Mar. 16, 2012, pp. 1-5, Alexandria, VA, USA.

Han Li, et al., Semantic Message Oriented Middleware for Publish/Subscribe Networks, Proceedings of SPIE, vol. 5403, Sensors, and Command, Control, Communications, and Intelligence (C3I) Technologies for Homeland Security and Homeland Defense III, Apr. 12, 2004, Orlando, FL, USA (as cited by USPTO in Office Action for U.S. Appl. No. 12/371,992).

Volker Haarslev, et al., Racer: An OWL Reasoning Agent for the Semantic Web, Proceedings of the International Workshop on Applications, Products and Services of Web-based Support Systems, 2003, vol. 13, pp. 91-95, Published in conjunction with the IEEE/WIC International Conference on Web Intelligence.

European Patent Office, International Search Report for PCT Application No. PCT/EP2009/052915, May 27, 2009, pp. 1-3, Rijswijk, The Netherlands.

European Patent Office, Written Opinion for PCT Application No. PCT/EP2009/052915, Oct. 28, 2010, pp. 1-7, Rijswijk, The Netherlands.

Liangzhao Zeng, et al., A Semantic Publish/Subscribe System, Proceedings of the IEEE International Conference on E-Commerce Technology for Dynamic E-Business, Sep. 2004, pp. 32-39, IEEE Xplore, Published at: http://ieeexplore.ieee.org/xpl/login.jsp?tp=&arnumber=1388297&url=http%3A%2F%2Fieeexplore.ieee.org%2Fiel5%2F9531%2F30211%2F01388297.pdf%3Farnumber%3D1388297.

State Intellectual Property Office of the People's Republic of China (SIPO), Office Action for Chinese Application No. 200980113638.3 (English translation not available), Jan. 24, 2013 pp. 1-5, P.R. China.

* cited by examiner

202

| Transformation Rules ||
| Natural Language Component | Subscription Request Component |
| --- | --- |
| a/an | @ |
| everything about all | # |
| all | ! |

Figure 3

401
— subscribe: a car ⇒ subscribe: cars/@

402
— subscribe: everything about all cars ⇒ subscribe: cars/#

403
— subscribe: all cars ⇒ subscribe: cars/!

Figure 4

TRANSFORMING A NATURAL LANGUAGE REQUEST FOR MODIFYING A SET OF SUBSCRIPTIONS FOR A PUBLISH/SUBSCRIBE TOPIC STRING

RELATED APPLICATIONS

This application is a continuation of and claims priority to and claims the benefit of U.S. patent application Ser. No. 12/371,992 titled "TRANSFORMING A NATURAL LANGUAGE REQUEST FOR MODIFYING A SET OF SUBSCRIPTIONS FOR A PUBLISH/SUBSCRIBE TOPIC STRING," which was filed in the United States Patent and Trademark Office on Feb. 17, 2009, and which is incorporated herein by reference in its entirety; and this application also claims priority to and claims the benefit of European Patent Application Serial No. 08154603.8 titled "TRANSFORMING A NATURAL LANGUAGE REQUEST FOR MODIFYING A SET OF SUBSCRIPTIONS FOR A PUBLISH/SUBSCRIBE TOPIC STRING," which was filed in the European Patent Office on Apr. 16, 2008, and which is also incorporated herein by reference in its entirety.

BACKGROUND

The present invention relates to transforming a natural language request for modifying a set of subscriptions for a publish/subscribe topic string.

Data is commonly provided across computer networks using publish/subscribe messaging systems. Publish/subscribe systems enable subscribers to subscribe to a particular subject or topic of information via a message broker. The publishers of a given topic publish the relevant data to the message broker. The message broker then disseminates the data to the appropriate subscribers. Subscribers subscribe to a given topic by sending a subscribe request to the message broker identifying a given topic.

Commonly, subscribe commands are initiated via web pages where the subscriber only needs to select an option presented by the web page. In other words, the subscription choices are predetermined. Other systems are provided that enable semantic elements of input instructions to be extracted for use in publish/subscribe systems. One problem with such systems is that they require significant processing resources.

BRIEF SUMMARY

An embodiment of the invention provides a method for transforming a natural language request for modifying a set of subscriptions for a publish/subscribe topic string, the method comprising: receiving, at a processing device, a natural language request for modifying a set of subscriptions for one or more topics in a publish/subscribe topic hierarchy, the natural language request comprising a predetermined natural language element; transforming the natural language request into a publish/subscribe topic string, wherein the predetermined natural language element is transformed into a publish/subscribe symbol, the symbol representing one or more topics in the topic hierarchy; and modifying one or more subscriptions to one or more topics based on the transformed topic string.

The set may be empty or may comprise one or more subscriptions. The request for modifying a set of subscriptions may be a subscribe request. The request for modifying a set of subscriptions may be an unsubscribe request. A given predetermined natural language element used in the natural language request in relation to a given topic may be selectively transformable into a plurality of publish/subscribe symbols. The occurrence of any one of a predetermined set of natural language elements may be transformed to the same publish/subscribe symbol.

The indefinite article used in the natural language request in relation to a given topic may be transformed to a publish/subscribe symbol representing a randomly selected topic from the topics within the same parent folder as the given topic.

In response to the identification of one of a set of predetermined elements in the natural language request in relation to one or more topics, contextual data may be used to identify a given topic for use in the topic string. The contextual data may be used in the transformation of the definite article. The contextual data may be used in the transformation of a possessive adjective. The contextual data may be provided by a user profile. The method may be performed by a publish/subscribe message broker.

Another embodiment provides a method for transforming a natural language request for subscribing to a publish/subscribe topic string, the method comprising: receiving, at a processing device, a natural language request for subscribing to one or more topics in a publish/subscribe topic hierarchy, the natural language request comprising a predetermined element; transforming the natural language request into a publish/subscribe topic string, wherein the predetermined element is transformed into a publish/subscribe symbol, the symbol representing one or more topics in the topic hierarchy; and subscribing to one or more topics based on the transformed topic string.

A further embodiment provides an apparatus for transforming a natural language request for modifying a set of subscriptions for a publish/subscribe topic string, the apparatus being operable to: receive a natural language request for modifying a set of subscriptions for one or more topics in a publish/subscribe topic hierarchy, the natural language request comprising a predetermined natural language element; transform the natural language request into a publish/subscribe topic string, wherein the predetermined natural language element is transformed into a publish/subscribe symbol, the symbol representing one or more topics in the topic hierarchy; and modify one or more subscriptions to one or more topics based on the transformed topic string.

Another embodiment provides a group of one or more programs arranged to enable a group of one or more programmable devices to perform a method for transforming a natural language request for modifying a set of subscriptions for a publish/subscribe topic string, the method comprising: receiving a natural language request for modifying a set of subscriptions for one or more topics in a publish/subscribe topic hierarchy, the natural language request comprising a predetermined natural language element; transforming the natural language request into a publish/subscribe topic string, wherein the predetermined natural language element is transformed into a publish/subscribe symbol, the symbol representing one or more topics in the topic hierarchy; and modifying one or more subscriptions to one or more topics based on the transformed topic string.

A further embodiment provides a group of one or more programs arranged to enable a group of one or more programmable devices to perform a method for transforming a natural language request for subscribing to a publish/subscribe topic string, the method comprising: receiving a natural language request for subscribing to one or more topics in a publish/subscribe topic hierarchy, the natural language request comprising a predetermined element; transforming the natural language request into a publish/subscribe topic string, wherein the predetermined element is transformed into a publish/subscribe symbol, the symbol representing one or more topics in the topic hierarchy; and subscribing to one or more topics based on the transformed topic string.

Another embodiment provides a group of one or more programs arranged to enable a group of one or more programmable devices to provide an apparatus for transforming a natural language request for modifying a set of subscriptions for a publish/subscribe topic string, the apparatus being operable to: receive a natural language request for modifying a set of subscriptions for one or more topics in a publish/subscribe topic hierarchy, the natural language request comprising a predetermined natural language element; transform the natural language request into a publish/subscribe topic string, wherein the predetermined natural language element is transformed into a publish/subscribe symbol, the symbol representing one or more topics in the topic hierarchy; and modify one or more subscriptions to one or more topics based on the transformed topic string.

A computer program product comprising a computer readable storage medium including computer readable program code, where the computer readable program code when executed on a computer causes the computer to receive a natural language request for modifying a set of subscriptions for one or more topics in a publish/subscribe topic hierarchy, the natural language request comprising a predetermined natural language element; transform the natural language request into a publish/subscribe topic string, wherein the predetermined natural language element is transformed into a publish/subscribe symbol, the symbol representing one or more topics in the topic hierarchy; and modify one or more subscriptions to one or more topics based on the transformed topic string.

BRIEF DESCRIPTION OF THE SEVERAL VIEWS OF THE DRAWINGS

Embodiments of the invention will now be described, by way of example only, with reference to the accompanying drawings.

FIG. 3 is a table illustrating transformations used by the message broker of FIG. 2.

FIG. 4 shows examples of natural language requests being converted to one or more subscription requests for a publish/subscribe topic string by the message broker of FIG. 2.

DETAILED DESCRIPTION

Figure 1:
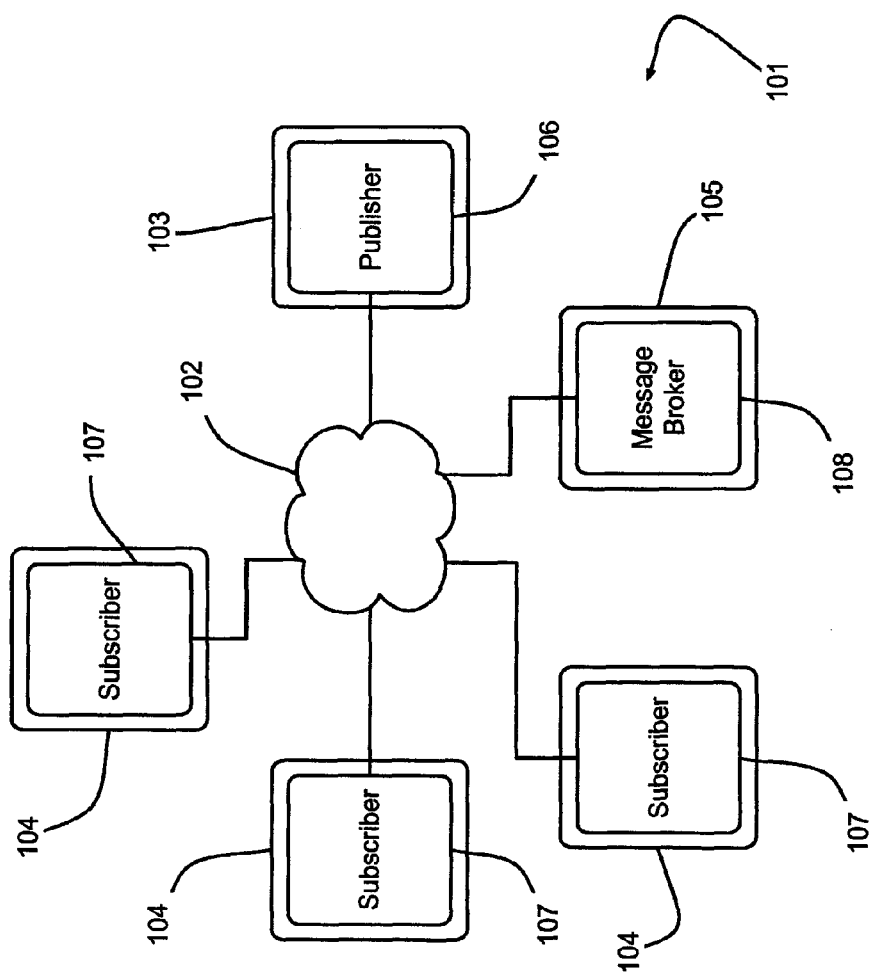
FIG. 1 is a schematic illustration of a computer system comprising a publish/subscribe messaging system.

With reference to FIG. 1, a computer system 101 provides a publish/subscribe messaging system and comprises a network 102 interconnecting a set of computers 103, 104, 105. The first computer 103 is arranged to run a message publisher application program 106, the second computers 104 are each arranged to run a message subscriber application program 107, and the third computer 105 is arranged to run a message broker application program 108. The message publisher 106 enables a user to publish messages on a predetermined set of message topics. The message subscribers 107 enable users to subscribe to particular message topics by sending an appropriate subscription request to the message broker 108 so as to receive the published messages on given topics. The message broker 108 is arranged to manage the sets of subscriptions for the message subscribers 107 and to manage the distribution of the published messages from the message publisher 106 to each appropriate message subscriber 107.

Figure 2:
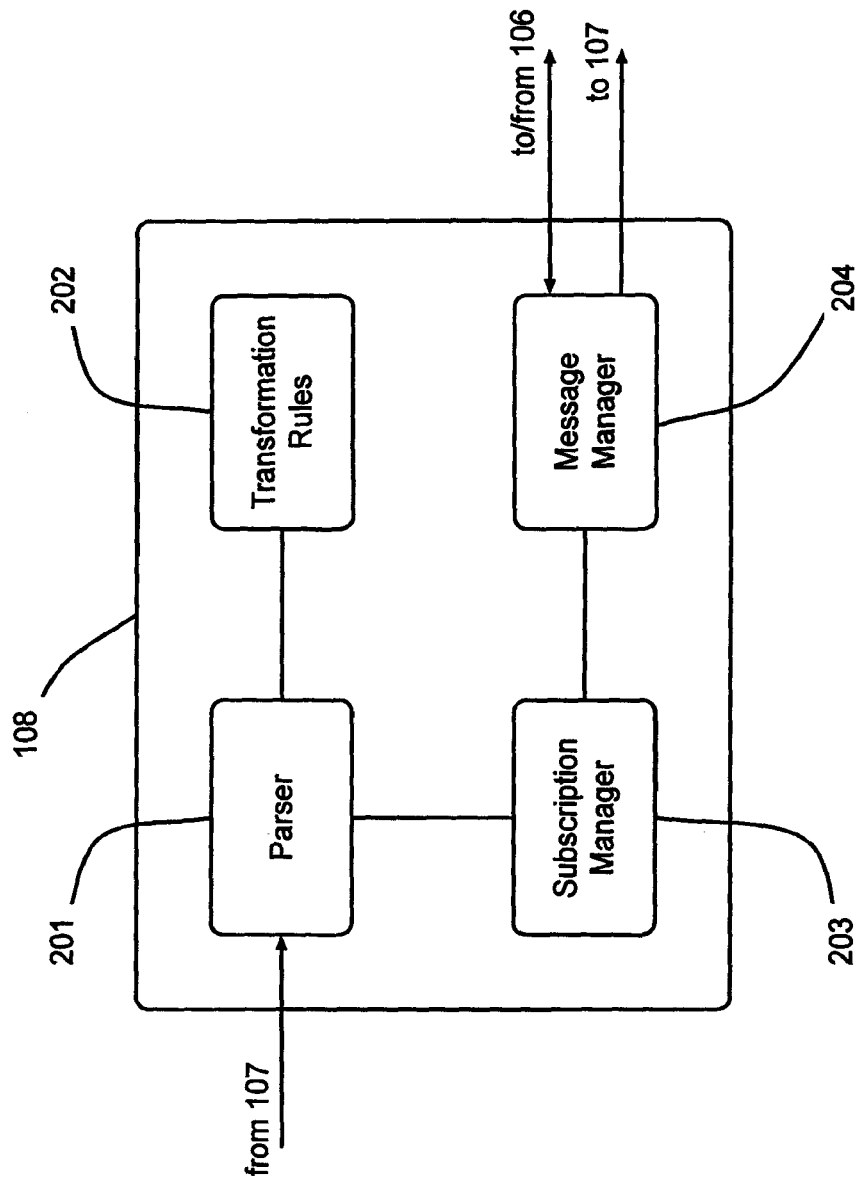
FIG. 2 is a schematic illustration of a message broker in the messaging system of FIG. 1.

With reference to FIG. 2, the message broker 108 further comprises a parser 201 for parsing incoming subscription requests from the message subscribers 107. The parser 201 uses a set of transformation rules 202 to transform elements of the incoming subscription requests. The transformed subscription requests are passed to a subscription manager 203, which manages the subscriptions for each message subscriber 107 and produces a distribution list for subscribed message topics. The message broker 108 further comprises a message manager 204 arranged to receive published messages from the message publisher 106 and to distribute the messages to the appropriate message subscribers 107 in accordance with the distribution lists compiled by the subscription manager 203. In the present embodiment, the message broker 108 is arranged to process subscription requests comprising elements of natural language and to transform such requests so that they are suitable for the standard subscription manager 203. In other words, the message broker 108 is arranged to transform each of a predetermined set of natural language elements that may form part of a subscription request into a suitable publish/subscribe system symbol. In the present embodiment, the transformation rules 202 define the predetermined set of natural language elements that may be transformed into corresponding publish/subscribe symbols. Furthermore, the parser 201 is arranged to identify any of a predetermined set of natural language elements within a given subscription request and to transform any such identified elements in accordance with the transformation rules 202. Thus the output of the parser 201 is a subscription request which formally defines a given topic string and can be successfully processed by the standard subscription manager 203 to perform the requested subscription.

FIG. 3 shows illustrative transformation rules 202 of the present embodiment in further detail. The transformation rules 202 comprise rules that apply to three natural language elements. The first transformation rule transforms the natural language element in the form of the indefinite article "a/an" to the symbol "@". The symbol "@" is a random selection wildcard arranged to randomly match a topic from the topics within the same parent folder as the specified topic. The second transformation rule transforms the natural language element "everything about all" to the symbol "#". The symbol "#" is a multilevel wildcard arranged to match all levels beyond a given topic in the topic hierarchy. In other words, this would result in a subscription to all topics, which have a root parent that matches the given topic. The third transformation rule transforms the natural language element "all" to the symbol "!". The symbol "!" is a single level wildcard arranged to match a single level within the topic hierarchy. In other words, this would result in a subscription to all topics, which have a direct parent that matches the given topic.

FIG. 4 illustrates an example of the operation of each of the transformation rules of the present embodiment to example subscription requests 401, 402, 403. In each example subscription request, the element is identified and transformed into the corresponding symbol in the output topic string.

Figure 5:
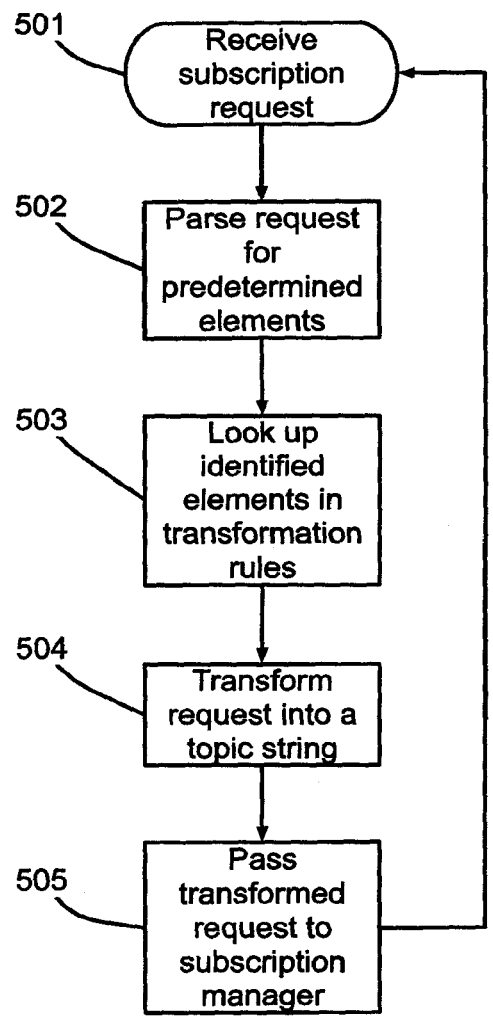
FIG. 5 is a flow chart illustrating the processing performed by the message broker when performing the transformations of FIG. 3.

The processing performed by the parser 201 when processing incoming subscription request will now be described in further detail with reference to the flowchart of FIG. 5. At step 501, the parser 201 is initiated and awaits receipt of a subscription request. Once a request is received, processing moves to step 502. At step 502, the request is parsed so as to identify any natural language elements and processing moves to step 503. At step 503, the appropriate transformation rule 202 for each identified element is selected and processing moves to step 504. At step 504, the natural language request is transformed into a publish/subscribe topic string including the appropriate symbol in place of the received element. Processing then moves to step 505 where the transformed subscribe request is passed to the subscription manager 203. Processing then moves to step 501 to await the receipt of a further subscription request and then proceeds as described above.

In another embodiment, the parser is arranged to transform unsubscribe requests in an equivalent manner. In a further embodiment, multiple natural language elements are transformed to a given symbol. In other words, there is a many-to-one mapping between a plurality of elements and a given symbol. For example, a group of non-specific adjectives or pronouns such as "a/an", "any" or "some" may be transformed to a single symbol such as "@" resulting in a subscription to one or more random topics.

In another embodiment, a given element may be selectively transformed to a plurality of symbols. In such a one-to-many transformation arrangement, the selection of a particular one of the plurality of symbols may be determined via a user or system preferences. For example, the element "all" may be transformed to either the symbol "#", a multilevel wildcard arranged to match all levels beyond a given topic in the topic hierarchy or the symbol "!", a single level wildcard arranged to match a single level within the topic hierarchy. Which of the transformations is used in a given arrangement may be user selected.

In a further embodiment, contextual data is used in the disambiguation of elements. For example, contextual data may be used to determine the object referred to when the definite article element "the" is used in a given subscribe request. For example, the statement "the car" is ambiguous as it may refer to a number of cars. However, inspection of the current context, represented by contextual data, may enable the identification of the particular car being referred to. Other examples where contextual data may be used is when a element is a possessive article such as "my", "her" or "our". In another embodiment, the parser and transformation rules are located on the client side, that is, associated with the subscriber application program.

It will be understood by those skilled in the art, the system may be provided at any suitable location within the publish/subscribe system. It will be understood by those skilled in the art, transformations for other elements and symbols may be provided.

It will be understood by those skilled in the art that the term natural language is used to refer to input statements that comprise one or more elements of natural language elements. In other words, such input statements may comprises natural language elements along with one or more other elements or they may comprise only natural language elements.

It will be understood by those skilled in the art that the apparatus that embodies a part or all of the present invention may be a computing device having software arranged to provide a part or all of an embodiment of the invention. The device could be a single device or a group of devices and the software could be a single program or a set of programs. Furthermore, any or all of the software used to implement the invention can be communicated via any suitable storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for transforming a natural language request for modifying a set of subscriptions for a publish/subscribe topic string, the method comprising:

receiving, at a processing device, a natural language request for modifying a set of subscriptions for one or more topics in a publish/subscribe topic hierarchy, the natural language request comprising a topic in the hierarchy and a predetermined natural language element;

transforming the natural language request into a publish/subscribe topic string, wherein the predetermined natural language element is transformed into a publish/subscribe symbol, the symbol identifying a hierarchical relationship between the topic in the natural language request and one or more other topics in the topic hierarchy; and modifying one or more subscriptions to include one or more topics having the identified hierarchical relationship to the topic in the natural language request based on the transformed topic string.

2. The method according to claim 1, where the request for modifying a set of subscriptions is selected from the group consisting of a subscribe request and an unsubscribe request.

3. The method according to claim 1, where a given predetermined natural language element used in the natural language request in relation to a given topic is selectively transformable into a plurality of publish/subscribe symbols.

4. The method according to claim 1, where an occurrence of any one of a predetermined set of natural language elements is transformed to a same publish/subscribe symbol.

5. The method according to claim 1, where, in response to the identification of one of a set of predetermined elements in the natural language request in relation to one or more topics, contextual data is used to identify a given topic for use in the topic string.

6. The method according to claim 5, where the contextual data is used in a transformation of a definite article or a possessive adjective.

7. The method according to claim 6, where the contextual data is provided by a user profile.

8. The method according to claim 1, where the method is performed by a publish/subscribe message broker.

9. A method for transforming a natural language request for subscribing to a publish/subscribe topic string, the method comprising:

receiving, at a processing device, a natural language request for subscribing to one or more topics in a publish/subscribe topic hierarchy, the natural language request comprising a topic in the hierarchy and a predetermined natural language element;

transforming the natural language request into a publish/subscribe topic string, wherein the predetermined natural language element is transformed into a publish/subscribe symbol, the symbol identifying a hierarchical relationship between the topic in the natural language request and one or more other topics in the topic hierarchy; and subscribing to one or more topics having the identified hierarchical relationship to the topic in the natural language request based on the transformed topic string.

10. Apparatus for transforming a natural language request for modifying a set of subscriptions for a publish/subscribe topic string, the apparatus comprising:
at least one processing device operable to (A) receive a natural language request for modifying a set of subscriptions for one or more topics in a publish/subscribe topic hierarchy, the natural language request comprising a topic in the hierarchy and a predetermined natural language element; (B) transform the natural language request into a publish/subscribe topic string, wherein the predetermined natural language element is transformed into a publish/subscribe symbol, the symbol identifying a hierarchical relationship between the topic in the natural language request and one or more other topics in the topic hierarchy; and (C) modify one or more subscriptions to include one or more topics having the identified hierarchical relationship to the topic in the natural language request based on the transformed topic string.

11. Apparatus according to claim 10, where the at least one processing device is further operable such that the request for modifying a set of subscriptions is selected from the group consisting of a subscribe request and an unsubscribe request.

12. Apparatus according to claim 10, where the at least one processing device is further operable such that a given predetermined natural language element used in the natural language request in relation to a given topic is selectively transformable into a plurality of publish/subscribe symbols.

13. Apparatus according to claim 10, where the at least one processing device is further operable such that an occurrence of any one of a predetermined set of natural language elements is transformed to a same publish/subscribe symbol.

14. Apparatus according to claim 10, where the at least one processing device is further operable such that, in response to the identification of one of a set of predetermined elements in the natural language request in relation to one or more topics, contextual data is used to identify a given topic for use in the topic string.

15. Apparatus according to claim 14, where the at least one processing device is further operable such that the contextual data is used in the transformation of the definite article or a possessive adjective.

16. Apparatus according to claim 14, where the at least one processing device is further operable such that the contextual data is provided by a user profile.

17. Apparatus according to claim 10, where the apparatus is provided by a publish/subscribe message broker.

18. A computer program product comprising a computer readable storage device including computer readable program code, where the computer readable program code when executed on a computer causes the computer to:
receive a natural language request for modifying a set of subscriptions for one or more topics in a publish/subscribe topic hierarchy, the natural language request comprising a topic in the hierarchy and a predetermined natural language element;
transform the natural language request into a publish/subscribe topic string, wherein the predetermined natural language element is transformed into a publish/subscribe symbol, the symbol identifying a hierarchical relationship between the topic in the natural language request and one or more other topics in the topic hierarchy; and
modify one or more subscriptions to include one or more topics having the identified hierarchical relationship to the topic in the natural language request based on the transformed topic string.

19. The computer program product of claim 18, where the computer readable program code when executed on the computer further causes the computer to, in response to the identification of one of a set of predetermined elements in the natural language request in relation to one or more topics, use contextual data to identify a given topic for use in the topic string.

20. The computer program product of claim 18, where the computer readable program code when executed on the computer further causes the computer to use the contextual data in a transformation of a definite article or a possessive adjective.

* * * * *